United States Patent [19]
Devarakonda et al.

[11] Patent Number: 6,055,562
[45] Date of Patent: Apr. 25, 2000

[54] DYNAMIC MOBILE AGENTS

[75] Inventors: Murthy Devarakonda, Briarcliff Manor; Ajay Mohindra, Yorktown Heights; Apratim Purakayastha, Elmsford; Deborra Jean Zukowski, Yorktown Heights, all of N.Y.

[73] Assignee: International Business Machines Corporation, Armonk, N.Y.

[21] Appl. No.: 08/847,079

[22] Filed: May 1, 1997

[51] Int. Cl.[7] .................................................. G06F 15/16
[52] U.S. Cl. ........................... 709/202; 709/201; 709/217
[58] Field of Search ......................... 395/200.32, 200.31, 395/200.47; 707/10, 3, 1, 103, 104, 109; 709/202, 201, 217, 224, 238

[56] References Cited

U.S. PATENT DOCUMENTS

| | | | |
|---|---|---|---|
| 5,452,433 | 9/1995 | Nihart et al. ............................. | 395/500 |
| 5,603,031 | 2/1997 | White et al. . | |
| 5,615,400 | 3/1997 | Cowsar et al. ........................... | 395/685 |
| 5,630,121 | 5/1997 | Braden-Harder et al. .............. | 395/604 |
| 5,678,045 | 10/1997 | Bettels .................................... | 395/758 |
| 5,727,147 | 3/1998 | van Hoff ............................. | 395/200.47 |
| 5,740,362 | 4/1998 | Buickel et al. ........................... | 707/10 |
| 5,793,965 | 8/1998 | Vanderbilt et al. ................ | 395/200.33 |
| 5,802,291 | 9/1998 | Balick et al. ....................... | 395/200.32 |
| 5,815,712 | 9/1998 | Bristor et al. ........................... | 395/701 |
| 5,822,526 | 10/1998 | Waskiewicz ....................... | 395/200.36 |
| 5,822,585 | 10/1998 | Noble et al. ............................. | 395/680 |

OTHER PUBLICATIONS

Mobile Agent Computing, Concordia White Paper, https//www.meitca.com/HSL/Projects/Concordia/Mobile-AgentsWhite Paper.html. No date.

Todd Paperioannou et al, "Mobile Agent Technology Enabling The Virtual Enterprise: A Pattern for Database Query", httpill Luckyspc.c60ro.acuk/Docs/Papers/Agents98.html. No date Mobile Agent Facility Specification, IBM Corp., Aug. 24, 1996.

Bill Venners, "Under the Hood: The Architecture of agents," httpillwww.jaraworld.com/javaworld/Jw–04–1997/Jw–04–hood.html, Apr. 1997.

D. Chess et al., "Itinerant Agents for Mobile Computing", Oct. 1995 pp. 1–29 (not including the cover sheet), IBM Research Division.

D. Chess et al., "Mobile Agents: Are They a Good Idea?", Dec. 1994 23 pages, IBM Research Division.

H. Peine et al., The Architecture of the Ara Platform for Mobile Agents, Dept. of Computer Science, University of Kaiserslauten, 12 pages.

Danny B. Lange et al., "Programming Mobile Agents in Java—With the Java Aglet API", Version 0.3, 20 pages, 1997.

Markus Strasser et al., "Mole—A Java Based Mobile Agent System", 8 pages, IPVR, (Institute for Parallel and Distributed Computer Systems), University of Stuttgart, Oct. 23, 1996.

(List continued on next page.)

*Primary Examiner*—Mehmet B. Geckil
*Attorney, Agent, or Firm*—Kevin M. Jordan

[57] ABSTRACT

An improved method and apparatus for dynamic execution of mobile agents. For example, a symbolic name for a component to be executed can be dynamically resolved using a component directory to determine an appropriate network host that the agent needs to visit. Preferably, the component directory can be queried by client or host machines, and updated by component hosts. Changes in a component's location and/or availability can also be captured at runtime and the agents dynamically routed to alternate component hosts. Still other features enable agents to flexibly accommodate the dynamics of the system. For example, if the attributes of a component are modified, or a component host becomes heavily loaded, agents can adapt to such changes by looking up an alternate host for the same component. Yet other features provide improved system manageability. For example, component hosts can freely update a component's location and/or attributes at any time. Changes to code for agents that use components residing at an updated component location are not required.

26 Claims, 5 Drawing Sheets

OTHER PUBLICATIONS

Robert S. Gray, "Agent Tcl: A flexible and secure mobile–agent system", Department of Computer Science, Dartmouth College, 15 pages, 1996.

Technical Report PCS–TR96–285, pp. 1–17, Department of Computer Science, Dartmouth College.

Robert Gray et al., "Mobile agents for mobile computing", May 2, 1996 Technical Report PCS–TR96–285, pp. 1–17, Department of Computer Science, Dartmouth College.

Don Gilbert et al., "IBM Intelligent Agents", IBM Corporation, Research Triangle Park, pp. 1–7, 1997.

Anselm Lingnau et al., "An Infrastructure for Mobile Agents: Requirements and Architecture", Fachbereich Informatik (Telematik), Johann Wolfgang Goethe–Universitat, Frankfurt am Main, Germany, (date is not available), 9 pages.

A DIRECTORY ENTRY

DYNAMIC MOBILE AGENTS

BACKGROUND

1. Field of the Invention

The present invention is related to the dynamic routing of mobile agents.

2. Related Art

A mobile agent can be written as a program that executes on a set of network hosts. The agent visits the network hosts to execute parts of its program. The agent may need, for example, to access information located on a given network host or there may be some preference to execute parts of its program on various network hosts.

In the prior art, the sequence of hosts that the agent visits is statically pre-configured when an agent program is written. For example, U.S. Pat. No. 5,603,031, Feb. 11, 1997, issued entitled "System and Method for Distributed Computation Based Upon the Movement, Execution, and Interaction of Processes in a Network," by White et al., describes a method for statically pre-configuring an agent's itinerary in a destination list composed of destination objects. Each destination object has a telename and a teleaddress preassigned to specific regions of the network. A static pre-configuration of an agent's itinerary introduces a number of weaknesses. First, a pre-configured program is not robust because it can fail if the location of the information or destination objects changes or if the network host becomes unavailable after the mobile agent is configured. Second, the pre-configured program is not amenable to a dynamic environment where network hosts can become unsuitable due to an increasing load. Third, the system can be difficult to manage because information or destination objects cannot be freely relocated without causing the programs that use them to fail. In "IBM Aglets WorkBench—Programming Mobile Agents in Java," by Lange et al., available on the World Wide Web at URL=http://www.trl.ibm.co.jp/aglets/whitepaper.html, Lange et al., suggest statically configuring multiple alternate network hosts. Although statically configuring multiple alternate network hosts may lessen some of the above weaknesses, it does not eliminate them.

SUMMARY

In accordance with the aforementioned needs, the present invention is directed to an improved method and apparatus for dynamic execution of mobile agents. In a preferred embodiment, a mobile agent is written using symbolic names for its constituent components. A symbolic name can be one of a physical address of a machine, a logical address of a machine, and a logical name of a component.

The present invention has features wherein a symbolic name for a component to be executed can be dynamically resolved using a component directory to determine an appropriate network host that the agent needs to visit. Preferably, the component directory can be queried by client or host machines, and updated by component hosts.

The present invention has other features which enable more robust agents. For example, changes in a component's location and/or availability can be captured at runtime and the agents dynamically routed to alternate component hosts.

The present invention has still other features which enable agents to flexibly accommodate the dynamics of the system. For example, if the attributes of a component are modified, or a component host becomes heavily loaded, agents can adapt to such changes by looking up an alternate host for the same component.

The present invention has yet other features which allow for improved system manageability. For example, component hosts can freely update a component's location and/or attributes at any time. Changes to code for agents that use components residing at an updated component location are not required.

BRIEF DESCRIPTION OF THE DRAWINGS

These and other features of the present invention will become apparent from the accompanying detailed description and drawings, wherein.

DETAILED DESCRIPTION

Figure 1:
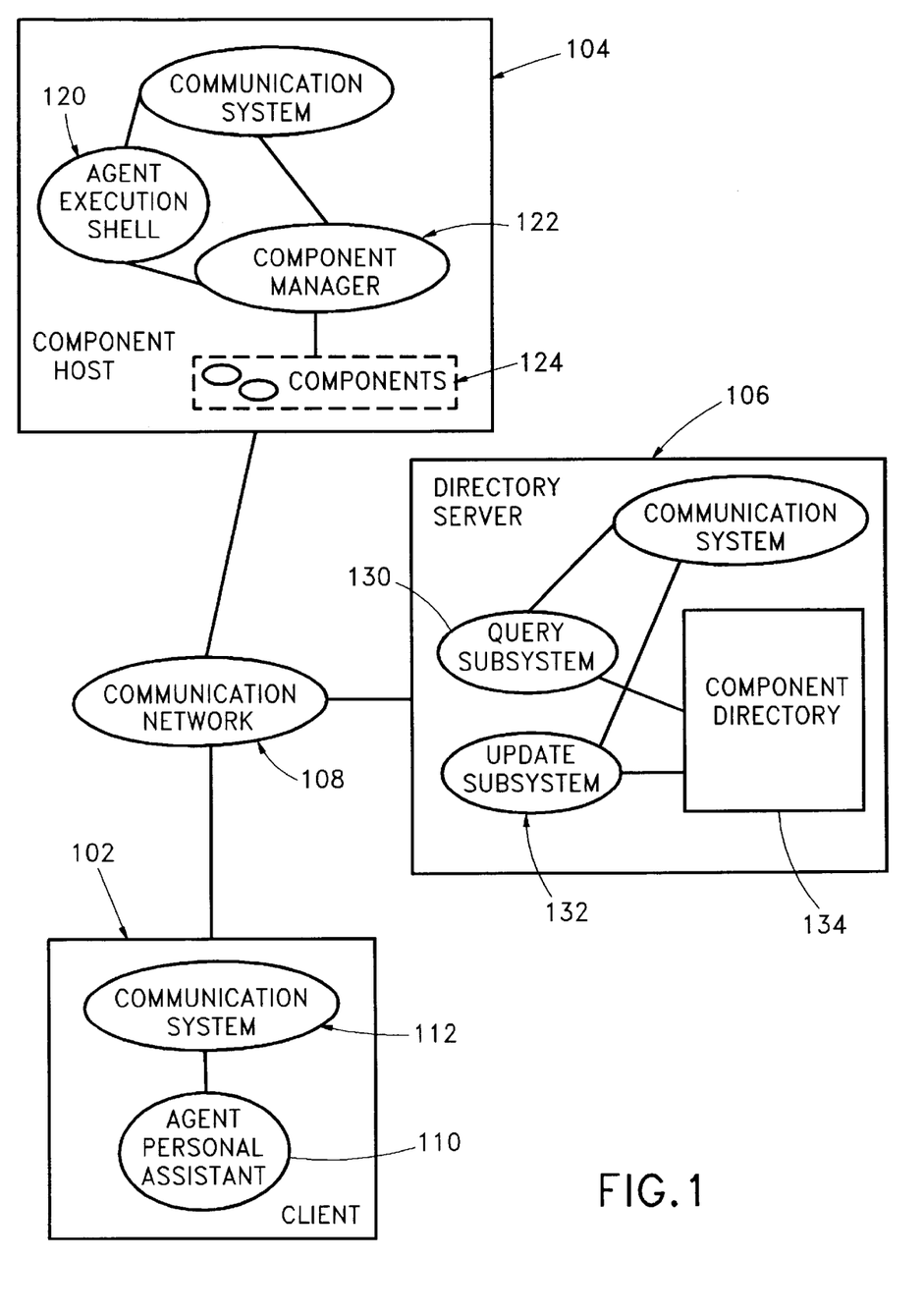
FIG. 1 shows an example of a loosely-coupled system having features of the present invention.

FIG. 1 depicts an example of a system having features of the present invention. Here, a loosely-coupled system connects computers that have distinct roles in the system. The computers 102–106, which can be running conventional operating systems such as OS2, UNIX, AIX, or Windows NT, are interconnected by way of a communication network 108 and communication protocol. The communication protocols can be, e.g., Sun Microsystems RPC, which can run either on UDP/IP or TCP/IP. The network 108 can be a LAN, Internet, or intranet. The client 102 and Component Host 104 can be embodied as conventional personal computers (PC) such as IBM PCs. The Directory Server 106 can be embodied by conventional servers such as an IBM RISC System/6000 machine. Note that the distinction between a Client 102 and a Component Host 104 is logical only.

Although a single Client 102 is shown, there can be many client machines in the system. Agents are invoked on the Client machines. The execution of an agent is coordinated on the Client by a software subsystem called the Agent Personal Assistant (APA) 110 (details in FIG. 3) which is invoked each time an agent is launched on a client machine.

On each computer there is a conventional Communication System 112, such as the TCP/IP stack in the operating system, that is used to communicate over the network. The system also includes a Component Host 104. Although only one is shown, there can be a plurality of Component Hosts in the system. The Component Host 104 stores a number of Components 124 that can be accessed by agent programs running on this machine. Components can be considered as one or more object classes including applets and servlets. Those skilled in the art will appreciate however, that a component can be generalized to any executable unit of code. According to the present invention, each Component Host includes a software subsystem called an Agent Execution Shell 120 (details in FIG. 4) that acts as the single coordinator for component execution by any agent.

The Component Host also has a Component Manager 122 subsystem that manages the local components 124. An example of a conventional Component Manager is an object store for serving and locally managing Components 124. such as is sold under the trademark OBJECTSTORE by Object Design (see e.g., http://www.odi.com). The Component Manager 122 serves components to the Agent Execution Shell 120. According to the present invention, the Component Manager 122 is adapted to communicate with the Directory Server 106 to query or update component 124 properties. The Component Manager 122 may also add new components, delete components, or modify component names, locations, and attributes. The Component Manager 122 may update component properties in an explicit fashion under the control of a system administrator. The Component Manager 122 can also periodically update dynamic component attributes such as availability and the load on the Component Host.

The system also includes a Directory Server 106. An example of a Directory Server can be any LDAP compliant server such as Netscape's DIRECTORY SERVER. One skilled in the art can realize the same function using a standard database management server (DBMS) such as is sold by IBM under the trademark DB2. The Directory Server can also be embodied by a plurality of computers cooperating together and appearing as a single directory server. Although it is shown separately, the Directory Server 106 could alternately reside on a Component Host 104, or even a client (having sufficient performance and storage).

As will be discussed in more detail with reference to FIGS. 2–5, the Directory Server and Component Directory 134 provide important features of the present invention. For example, a symbolic name for a named component to be executed can be dynamically resolved using the Component Directory to determine an appropriate Component Host 104 that the agent needs to visit. Preferably, the Component Directory can be queried by Clients 102 or Component Hosts 104 and updated by Component Hosts. As will be discussed with reference to FIG. 2A and 2B, the Component Directory 134 can be implemented as a conventional relational table that includes a plurality of directory entries 202 (also called records). Each directory entry stores component properties such as the name, location, and attributes of the component. Those skilled in the art will appreciate that although the preferred embodiment implements the function of the Directory Server 106 as a conventional DBMS, that the present invention could be implemented using a non-relational table or other structure, such as a tree.

Referring again to FIG. 1, the Directory Server includes a Query Subsystem 130 and an Update Subsystem 132. The Query Subsystem 130, which will be discussed in more detail with reference to FIG. 2C, allows the client 102 or Component Host 104 to query the contents of the Component Directory 134. The Update Subsystem 132, which will be discussed in more detail with reference to FIG. 2D, allows component hosts to add, modify, or delete components in the component directory.

Figure 2A:
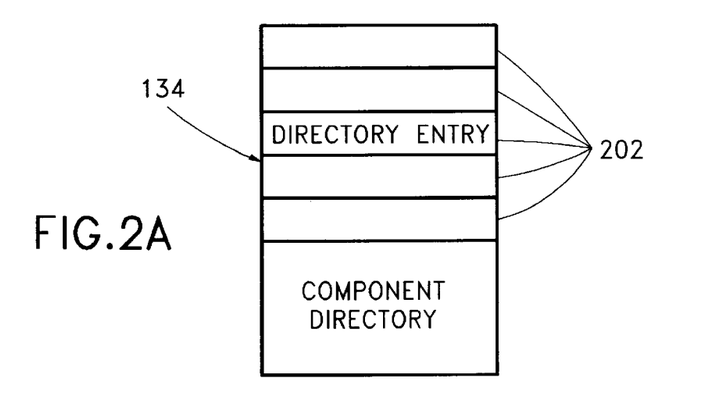
FIG. 2A shows an example of the Component Directory of FIG. 1.

FIG. 2A shows a more detailed example of the Component Directory 134. As will be described with reference to FIG. 2B, the Component Directory 134 includes a plurality of Directory Entries 202.

Figure 2B:
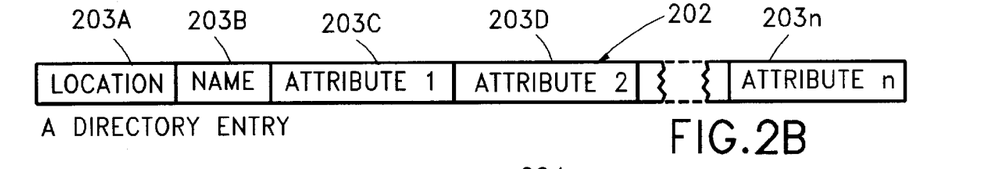
FIG. 2B shows an example of a record in the Component Directory.

FIG. 2B shows a more detailed example of a Directory Entry 202. As depicted, each Directory Entry 202 stores properties and a set of attributes for a single Component 124. The component attributes are attribute name and value pairs describing supported features. In this example, each entry 202 stores a plurality of attribute values for component properties $203a \ldots 203n$ such as the name $203b$, location $203a$, and/or other attributes $203c \ldots 203n$ of the component such as a machine architecture type or a load indicator.

Figure 2C:
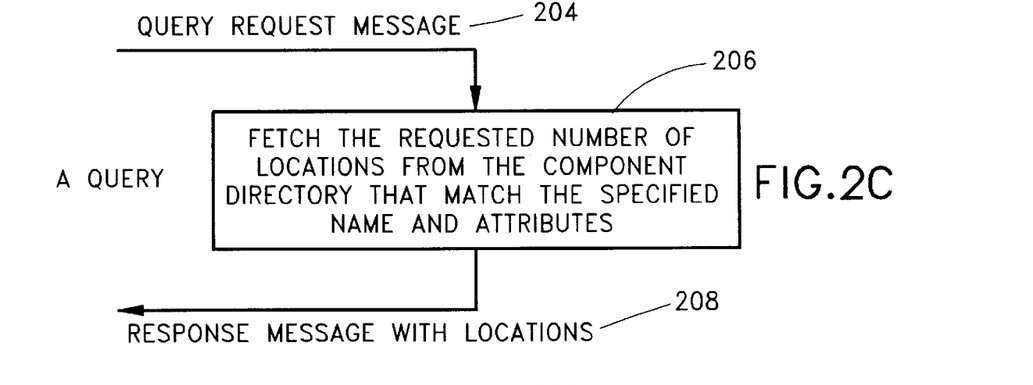
FIG. 2C shows an example of logic for the Query Subsystem of FIG. 1.

FIG. 2C shows an example of logic for the Query Subsystem 130. As depicted, in step 204, a query request message from a Client 102 or Component Host 104 arrives at the Query Subsystem 130 of the Directory Server 106. The query request message contains the name and attributes of a desired component and preferably the number of desired locations to be returned that match the specified name and attributes. In step 206, the Query Subsystem 130 retrieves the requested number of component locations $203a$ from the Component Directory 134 that match the name $203b$ and attributes $203c \ldots 203n$ in the query request message. In step 208, the Directory Server 106, communicates a query result message containing the retrieved component locations to the requesting Client 102 or Component Host 104.

Figure 2D:
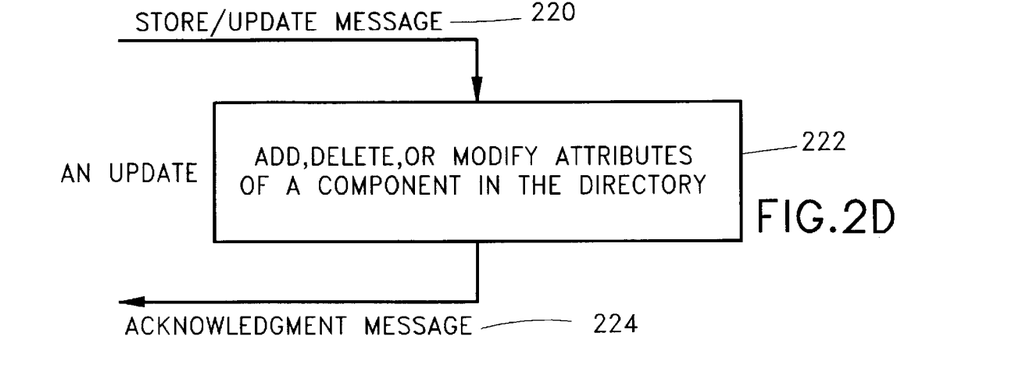
FIG. 2D shows an example of logic for the Update Subsystem of FIG. 1.

FIG. 2D shows an example of logic for the Update Subsystem 132. As depicted, in step 220, an update message arrives from a Component Host 104 to the Update Subsystem 132 of the Directory Server 106. In step 222, the Update Subsystem 132 updates (adds, modifies, or deletes) one or more Directory Entries 202 specified in the update message. In step 224, the Directory Server 106 then communicates an acknowledgment to the requesting Component Host 104.

Figure 3:
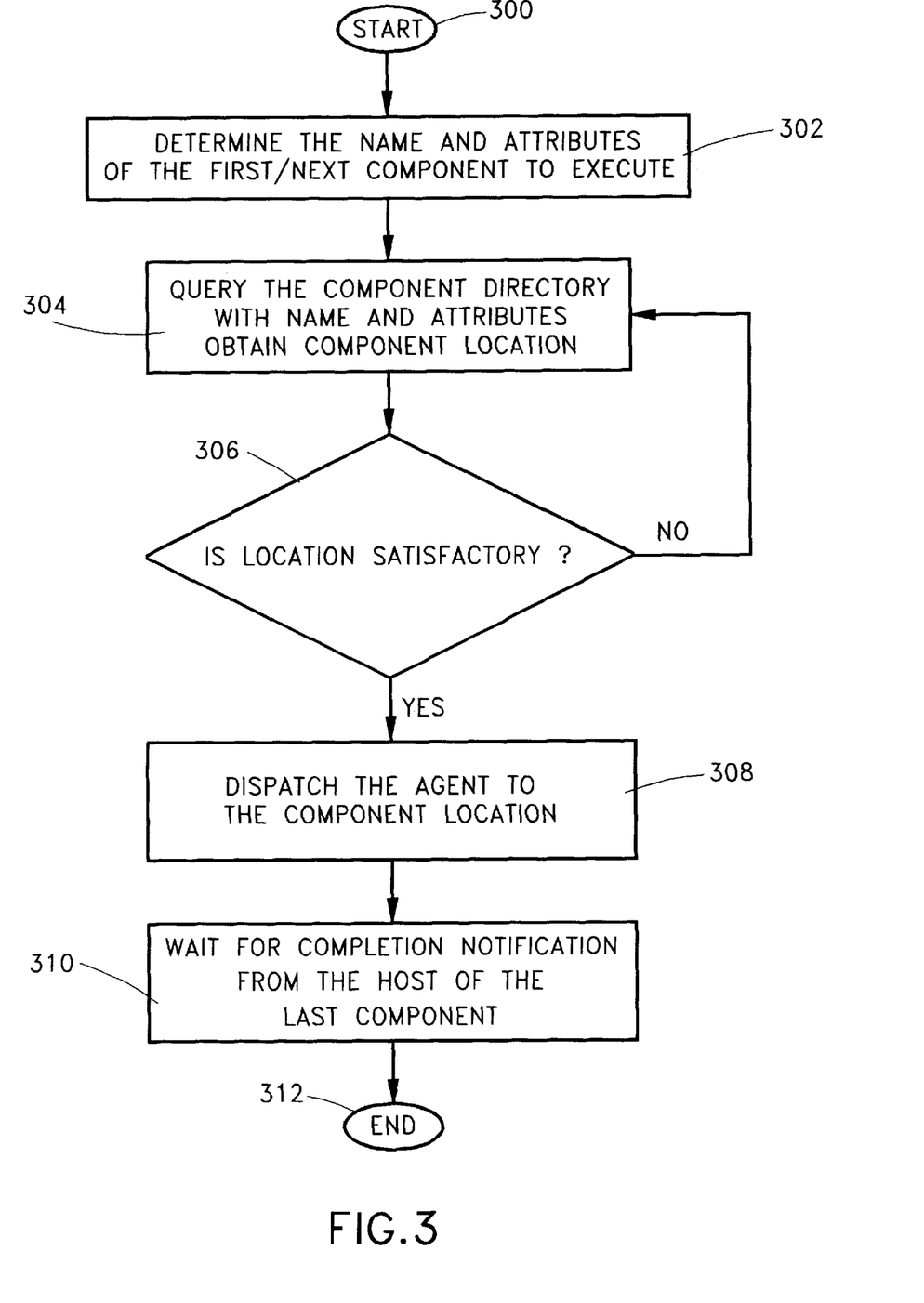
FIG. 3 shows an example of logic for the Agent Personal Assistant of FIG. 1.

FIG. 3 shows an example of logic for the Agent Personal Assistant 110. The Agent Personal Assistant (APA) 110 is preferably invoked each time an agent is launched by a client. In step 302, the APA inspects the agent to determine the name and attributes of the first component that the agent needs to execute. In step 304, the APA queries the Directory Server 106 with the name and attributes of the first component and obtains a location $203a$ of a Component Host 104 for the first component. In step 306, the APA tests if the location is satisfactory, for example by determining if the Component Host is unreachable due to a failure or a network partition. A failure could be indicated, for example, by a time-out when querying the Component Host. If the location is not satisfactory, the process returns to step 304 and the APA can query the Component Directory 134 for another location. Thus, the present invention enables agents to flexibly accommodate the dynamics of the system. If the attributes of a component are modified, or a Component Host becomes overloaded, agents can adapt to such changes by looking up an alternate host for the same component. If the location is satisfactory, in step 308, the APA dispatches the agent to that location. Alternately, the component could be downloaded from the Component Host for execution on the client. In this alternative the process would return to step 302 (and repeat) until the client executed all the components. In step 310, the APA waits until it receives a completion notification from the Component Host that executed the last component of the agent. The process ends in step 312, upon receipt of the completion notification.

Figure 4:
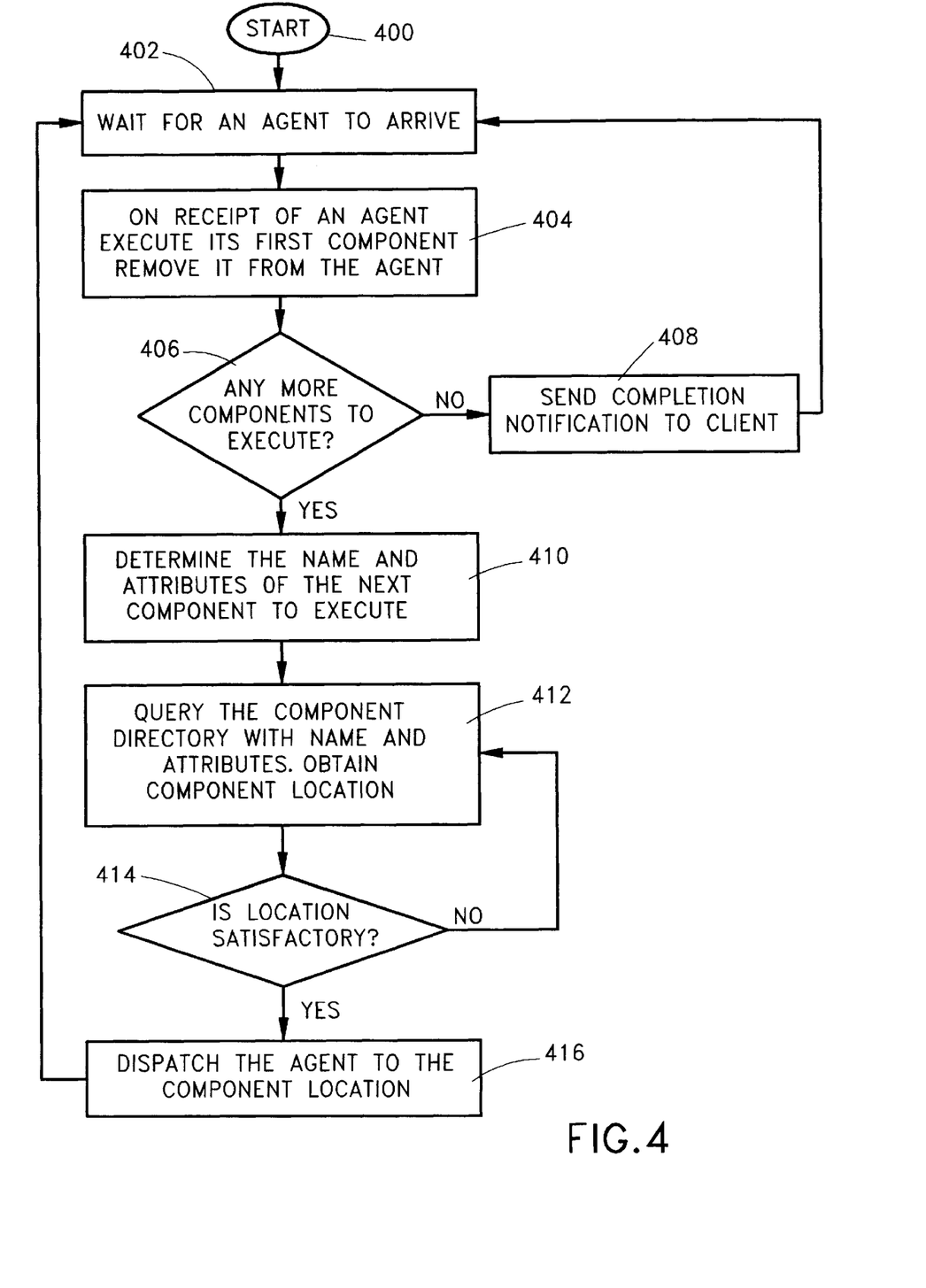
FIG. 4 shows an example of logic for the Agent Execution Shell of FIG. 1.

FIG. 4 shows an example of logic for the Agent Execution Shell (AES) 120. Unlike the APA 110, which is invoked each time an agent is launched on the client, the AES logic preferably runs, for example, as a daemon on the Component Host 104 and coordinates the execution of all agents on the Component Host 104. In step 402, the AES 120 waits for an agent to arrive. In step 404, upon the arrival of an agent, the AES executes the first component of the agent and removes it from the agent. In step 406, the AES determines if there are any more components that this agent needs to execute. If not, in step 408, the AES sends a completion notification to the originating client and the process repeats, at step 402. If there are more components to be executed, in step 410, the AES determines the name and attributes of the next component associated with the agent. In step 412, the Component Manager 122, queries the Directory Server 106 with the additional name and attributes and obtains a corresponding component location. In step 414, the AES 120 tests, for example, if the location is satisfactory by determining if the location is unreachable, for example, due to a failure. If the location is not satisfactory, the process iterates step 412 and step 414, i.e., the AES repeatedly queries the Component Directory and tests new locations until a satisfactory location is obtained. In step 416, when a satisfactory location is obtained, the AES forwards the agent to that location. The process then returns to step 402 and the AES waits for another agent to arrive. Note that in an alternative embodiment, the AES 120 can create a delegate to coordinate actual component execution and agent forwarding while it simply waits for the arrival of the next agent.

Figure 5:
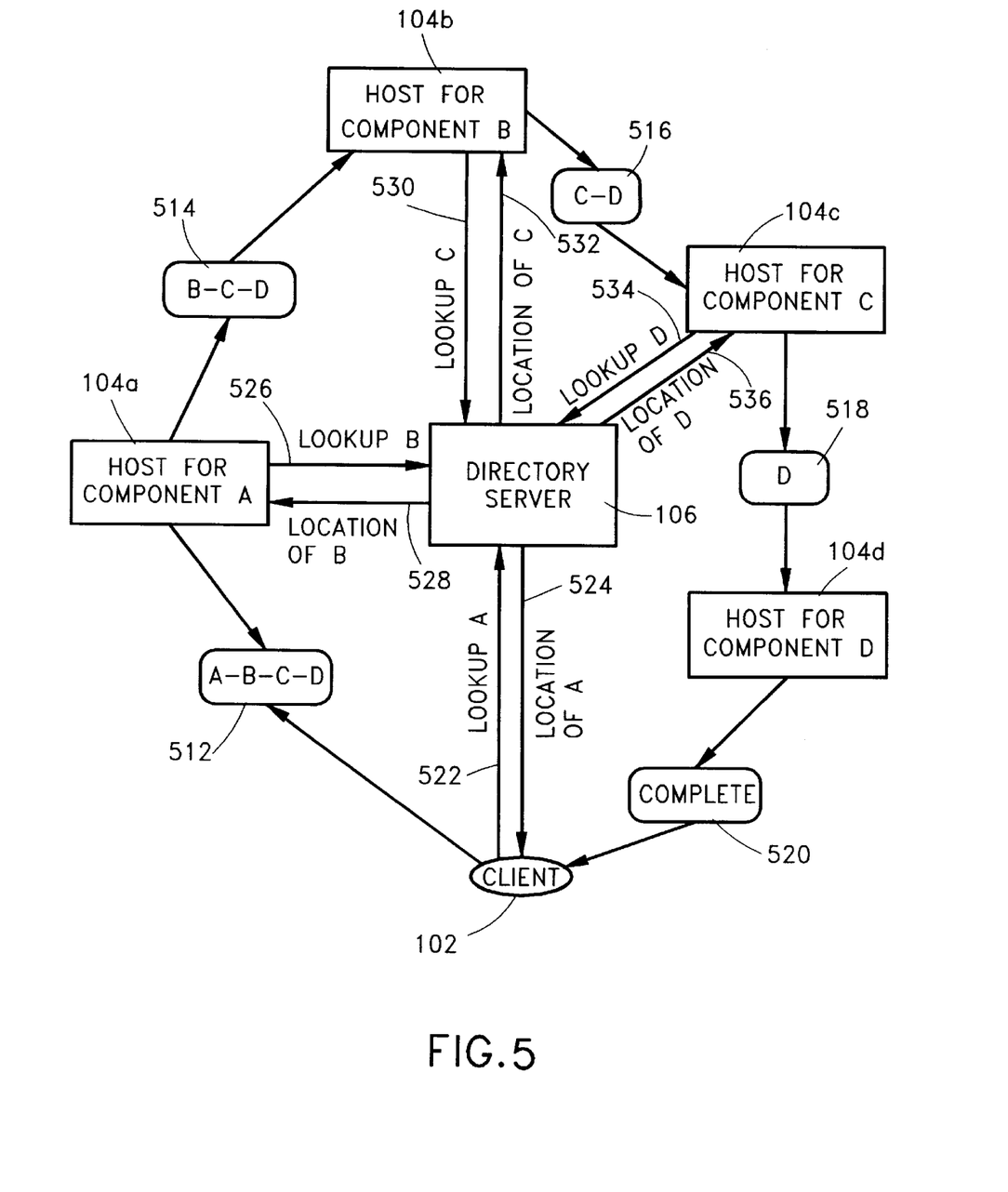
FIG. 5 shows an example of logic for the composition, routing, and execution of an agent.

FIG. 5 shows an example of logic for the composition, routing, and execution of a dynamic mobile agent in the system. By way of example only, the system depicted includes a client 102, four Component Hosts 104a–104d, and a single Directory Server 106. The agent initially includes a list 512 of four component names A, B, C, and D that are to be executed in order. In step 522, the client 102 queries the Directory server 106 for component A and obtains the value of the corresponding location 203a, in step 524. Next, the client 102 forwards the agent including the list 512 to the Component Host 104a for component A. The Host 104a then executes component A and removes it from the agent's list 514 of components. In step 526, the Component Host 104a queries the Directory Server 106 for the location of component B. In step 528, the Component Host 104a obtains the value, here Host 104b, of the corresponding location 203a for component B. Next, the Component Host 104a dispatches the updated agent 514 to the Host 104b for component B. In steps 530–536, the remaining components of the agent are similarly located and executed on component hosts 104b and 104c. Finally, Component Host 104d executes the last component of the updated agent 518 and sends a completion notification 520 to the client 102.

Now that the invention has been described by way of a preferred embodiment, various modifications and improvements will occur to those of skill in the art. Thus, it should be understood that the preferred embodiment is provided as an example and not as a limitation. The scope of the invention is defined by the appended claims.

We claim:

1. A computerized method of dynamically routing mobile agents including a plurality of executable units, comprising the steps of:
   a) determining a name and attribute that specifies a logical requirement of an executable unit;
   b) dynamically selecting one or more target locations as a function of the name and the attribute; and
   c) dispatching a mobile agent to a selected target location for executing the executable unit.

2. The method of claim 1, further comprising the step of determining if there is a need for executing additional executable units.

3. The method of claim 1, wherein the executable unit is a component reference and the target location is a component location.

4. The method of claim 2, further comprising the steps of iterating steps a, b, and c for additional executable units.

5. The method of claim 1, wherein the executable unit is one of: one or more object classes; an applet; a servlet; and a block of executable inline code.

6. The method of claim 1, wherein the name is one of: a physical address of a machine; a logical address of a machine; and a logical name of a component.

7. The method of claim 1, wherein the attribute is one of: a machine architecture type; a load indicator; and a set of supported features.

8. The method of claim 1, wherein the target location is a function of a component name and attribute, said dynamically selecting step further comprises the step of dynamically resolving a component name using a component directory.

9. The method of claim 1, further comprising the steps of:
   dynamically determining that the target location is unavailable or overloaded; and
   dynamically selecting an alternate target location as a function of the name and the attribute.

10. The method of claim 1, further comprising the steps of:
    dynamically modifying one or more of the target location and the attribute, without requiring any change in code associated with the mobile agent that uses an executable unit at a modified target location.

11. A system for dynamically routing mobile agents in a computer network including a plurality of executable units, comprising:
    a) means for determining a name and attribute that specifies a logical requirement of an executable unit;
    b) means for dynamically selecting one or more target locations by dynamically querying a directory as a function of the name and the attribute, coupled to said means for determining; and
    c) means for dispatching a mobile agent to a selected target location for executing the executable unit, coupled to said means for dynamically selecting.

12. The system of claim 11, further comprising means for determining if there is a need for executing additional executable units.

13. The system of claim 11, wherein the executable unit is a component reference and the target location is a component location.

14. The system of claim 12, further comprising the steps means for iterating said means a, b, and c for the additional executable units, coupled to said means for determining.

15. The system of claim 11, wherein the executable unit is one of: one or more object classes; an applet; a servlet; and a block of executable inline code.

16. The system of claim 11, wherein the name is one of: a physical address of a machine; a logical address of a machine; and a logical name of a component.

17. The system of claim 11, wherein the attribute is one of; a machine architecture type; a load indicator; and a set of supported features.

18. The system of claim 11, wherein the target location is a function of a component name and attribute, said means for dynamically selecting further comprising component directory means for dynamically resolving a component name.

19. The system of claim 11, further comprising:
    said means for communicating including means for dynamically determining that the target location is unavailable or overloaded; and
    means for dynamically selecting an alternate target location as a function of the name and the attribute, coupled to said means for dynamically determining.

20. The system of claim 11, further comprising:

means for dynamically modifying one or more of the target location and the attribute, without requiring any change in code associated with the mobile agent that uses an executable unit at a modified target location.

21. A program storage device, readable by a machine, tangibly embodying a program of instructions executable by the machine to perform method steps for dynamically routing mobile agents including a plurality of executable units, said method steps comprising:

a) determining a name and attribute that specifies a logical requirement of an executable unit;

b) dynamically selecting one or more target locations as a function of the name and the attribute; and c) dispatching a mobile agent to the selected target location for executing the executable unit.

22. The program storage device of claim 21, wherein the target location is a function of a component name and attribute, and said dynamically selecting step further comprises the step of dynamically resolving a component name using a component directory.

23. The program storage device of claim 21, further comprising the steps of:

dynamically determining that the target location is unavailable or overloaded; and dynamically selecting an alternate target location as a function of the name and the attribute.

24. The program storage device of claim 21, further comprising the steps of:

dynamically modifying one or more of the target location and the attribute, without requiring any change in code associated with the mobile agent that uses an executable unit at a modified target location.

25. The program storage device of claim 21, further comprising the step of determining if there is a need for executing additional executable units.

26. The program storage device of claim 25, further comprising the steps of iterating steps a, b, and c for additional executable units.

\* \* \* \* \*